United States Patent [19]

Turek

[11] Patent Number: 5,432,989
[45] Date of Patent: Jul. 18, 1995

[54] APPARATUS AND METHOD FOR JOINING SHEET MATERIAL

[75] Inventor: Stanley P. Turek, Willowbrook, Ill.

[73] Assignee: Archer Manufacturing Corporation, Chicago, Ill.

[21] Appl. No.: 217,014

[22] Filed: Mar. 23, 1994

Related U.S. Application Data

[63] Continuation of Ser. No. 967,185, Oct. 27, 1992, abandoned.

[51] Int. Cl.$^6$ ............................................. B23P 11/00
[52] U.S. Cl. ................................. 29/243.5; 29/283.5; 72/358
[58] Field of Search ............. 29/243.5, 283.5, 243.522, 29/509, 522.1; 72/344, 358

[56] References Cited

U.S. PATENT DOCUMENTS

| | | |
|---|---|---|
| 155,098 | 9/1874 | Merriken ........................ 72/358 X |
| 475,609 | 5/1892 | Richards . |
| 893,018 | 7/1908 | Schoenborn et al. ............. 72/358 X |
| 2,810,478 | 10/1957 | Sejournet et al. ................. 72/358 X |
| 3,579,809 | 5/1971 | Wolf et al. . |
| 3,730,044 | 5/1973 | Sawdon . |
| 3,937,122 | 2/1976 | Reidel . |
| 4,035,901 | 7/1977 | Lux et al. . |
| 4,340,330 | 7/1982 | Reidel . |
| 4,394,794 | 7/1983 | Shirey . |
| 4,459,735 | 7/1984 | Sawdon . |
| 4,569,111 | 2/1986 | Mutou . |
| 4,574,453 | 3/1986 | Sawdon . |
| 4,574,473 | 3/1986 | Sawdon . |
| 4,584,753 | 4/1986 | Eckold et al. . |
| 4,722,647 | 2/1988 | Sawdon . |
| 4,757,609 | 7/1988 | Sawdon . |
| 4,760,632 | 8/1988 | Rapp . |
| 4,760,634 | 8/1988 | Rapp . |
| 4,803,767 | 7/1989 | Obrecht et al. . |
| 4,831,171 | 5/1989 | Bergfeld et al. . |
| 4,831,704 | 5/1989 | Rapp . |
| 4,831,711 | 5/1989 | Rapp . |
| 4,878,284 | 11/1989 | Sawdon . |
| 4,910,853 | 3/1990 | Sawdon . |
| 5,027,503 | 7/1991 | Sawdon . |
| 5,031,442 | 7/1991 | Kynl . |
| 5,138,758 | 8/1992 | Gubbiotti et al. . |
| 5,230,136 | 7/1993 | Cronn et al. .................... 29/243.5 X |

FOREIGN PATENT DOCUMENTS 1237574  6/1988  Canada ............................... 29/283.5

OTHER PUBLICATIONS

BTM Corporation, "Tog-L-Lock" Sheet Metal Joining System Pamphlet.
Tox–System Specifications.
New Equipment Digest, Feb., 1992, p. 58, Tech–Line Clinching System, Mark NED–102.
BTM Corporation, "Tog-L-Lock" Sheet Metal Joining System Brochure.
TOX Corporation, TOX Joining System, "Joining Sheet Metal Parts by Punch and Die", Hanns Peter Liebig, Jan Bober and Joerg Mutschler, Hamburg, Germany.
TOX Corporation, TOX Brochure.

*Primary Examiner*—Joseph M. Gorski
*Attorney, Agent, or Firm*—Dvorak and Traub

[57] ABSTRACT

An apparatus for joining a plurality of metal sheets by first drawing and then laterally extruding the metal into an enlarged shape which will permanently and mechanically interlock the two metal sheets. The apparatus utilizes a novel die body construction in which the die body has a cavity wall provided with a plurality of longitudinally extending flutes which communicate with a depressed groove surrounding a centrally raised portion of an anvil. Upon compression and drawing, the material from the metal sheets will extrude from the raised central portion of the anvil into the depressed groove and the extrude laterally into the substantially longitudinally extending flutes which allow the finished assembly to be withdrawn from the die body along the path of the substantially longitudinally extending flutes. A method of forming a joint between metal sheets is also disclosed. Also disclosed is a die body which permits withdrawal of the finished product without requiring movable releasable portions in the die. To improve the bottom of a cavity punched out by a punch, the punch may be provided with an intaglio figure to emboss a corresponding figure in the bottom of the metal sheet.

12 Claims, 1 Drawing Sheet

APPARATUS AND METHOD FOR JOINING SHEET MATERIAL

This application is a continuation of U.S. application Ser. No. 07/967,185, filed 27 Oct. 1992, and now abandoned.

BACKGROUND OF THE INVENTION

1. Field of the Invention

The present invention relates generally to joining sheet metal or other sheet materials, and more particularly to a method and apparatus for forming such joints.

2. Description of the Prior Art

There are various apparatus and methods in the art for joining a plurality of pieces of sheet metal by punching or otherwise manipulating them to cause them to be deformed into an interlocking relationship in a predetermined area. For example, U.S. Pat. No. 4,459,735 discloses a method for joining a plurality of pieces of sheet metal by first drawing and then laterally extruding the sheet material to be joined in an enlarged shape which will permanently and mechanically interlock the two sheets of metal. The apparatus for achieving such interlocking of the metal sheets consists of a punch assembly and a die assembly, the punch assembly having a punch which enters into a cavity in a die body having a bottom communicating with a circularly and laterally extending groove for accepting the extruded matter from the two metal sheets. Since it would have been impossible for withdrawing the two metal sheets from the die body because of the circular and lateral extruded metal, the die body is provided with movable segments which retract diametrically apart to release the extruded ring formed by the groove in the die body. The known apparatus is relatively complex in design and requires power actuation of both the punch and the portions of the die, thereby increasing the cost of the equipment as well as the energy required for the punching operation.

SUMMARY OF THE INVENTION

It is, therefore, a primary object of the present invention to provide an improved apparatus for permanently joining metal sheets utilizing simplified punch and die body assemblies.

A further object of the invention is to provide a die body having a cavity provided with longitudinally extending flutes which enable the punched product to be withdrawn without requiring a die assembly having retracting segments.

A further object of the invention is to provide a means for observing externally the proper degree of compression between the two sheets being joined when engaged between the punch and die members.

A further object of the invention is to provide a means whereby sheets joined by a single fastening will not be able to rotate with respect to each other about the fastening.

Another object of the present invention resides in the provision of an improved die assembly for use in sheet metal joining apparatus, which is readily adapted to many different joint configurations.

The apparatus for joining two or more metal sheets uses a punch means cooperating with a die assembly having a die body provided with a cavity for receiving the punch means to forcibly deform overlapped portions of the metal sheets. An anvil is centrally located in the cavity which has in its central cylindrical wall, a plurality of substantially vertically extending flutes. The anvil extends upwardly from a bottom of the cavity to define with respect to the cylindrical wall of the cavity, a concentrically located groove in the body. The bottom groove communicates with the plurality of the substantially vertically extending flutes. When the punch enters the cavity towards the anvil, the punch stops short of the anvil at a distance which is less than the total combined original thicknesses of the metal sheets to permit extrusion of the metal into the bottom grooves and into the communicating vertically extending flutes.

A method is disclosed for joining together metal sheets, wherein two pieces of metal sheets are assembled together in an overlapping relationship and thereafter positioned between a punch and a die having a cavity with an anvil extending from the bottom surface of the cavity, the anvil and a wall of the cavity defining therebetween a groove. The inner surface of the cavity is provided with a plurality of substantially vertically extending flutes. Thereafter, the punch is moved against the opposite side of the sheet metal assembly in a longitudinal direction towards the die cavity in a manner to draw both pieces of the metal sheets into the die cavity towards the anvil to form a cup-shaped portion with at least one side wall and a bottom wall without shearing any portion of the sheet metal, continuing the movement of the punch along said longitudinal direction towards the anvil to compress the bottom wall of said cup-shaped portion of the metal sheet therebetween and thereby extrude the bottom wall in a lateral direction to flow metal into the substantially vertically extending flutes, whereby there is formed laterally enlarged toes in the substantially vertically extending flutes which mechanically interlock the two metal sheets, the lateral extrusion occurring without fracture of any portion of the metal sheets, withdrawing the punch from the joined metal sheet assembly and withdrawing the metal sheet assembly with the lateral extrusions moving along the substantially vertically extending flutes.

The invention is also concerned with a die body useful for interlocking a pair of overlapped metal sheets which are to be extruded into each other in a configuration forced by a punch. The die body has a cavity, a bottom of said cavity having a central raised portion defining an anvil which is surrounded by a concentric depressed groove in the bottom. The cavity has an inner wall provided with substantially longitudinally extending flutes symmetrically placed with respect to each other, the flutes communicating with the depressed groove and extending laterally outwardly of the groove. The substantially longitudinally extending flutes lie along a peripheral circle having a diameter B which is greater than diameter A of the cavity, the diameter B being greater than twice the thicknesses of the two metal sheets, whereby upon deforming the two metal sheets in the die body, material will be extruded from the central raised portion into the depressed groove and into the substantially vertically extending flutes to define toes which interlock the two metal sheets together.

These and other objects, features and advantages of the present invention will become apparent from the subsequent description and the appended claims taken in conjunction with the accompanying drawings.

DESCRIPTION OF PREFERRED EMBODIMENTS

Figure 1:
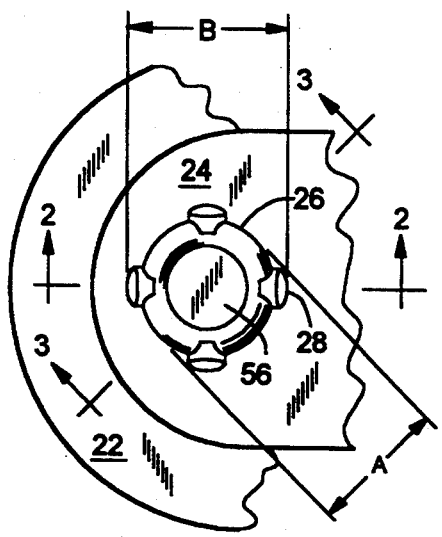
FIG. 1 shows a punched structure interlocking two sheets of metal together.

The apparatus for joining together two sheets of material in accordance with the present invention includes a punch assembly 10 operatively supporting punch means 12 supported over a die assembly 14 having a die body 16 provided with a cavity 18, which, in this discussion, is circular, and is provided with two pairs of substantially vertically extending flutes 20, each pair of flutes being diametrically spaced from each other. The circular cavity 18 has a diameter A, and the flutes 20 extend along a concentric circle having a diameter B. At the bottom of the cavity 18, there is located a centrally located area defining an anvil 25 which extends upwardly out of a depressed groove 27 which communicates with flutes 20. It should be noted that the physical dimensions of the die apparatus and the two metal sheets is largely magnified. For example, the thicknesses of the metal sheets 22 and 24 can vary in a range from 0.024 inches (0.6 millimeters) to 0.060 inches (1.5 millimeters). Metal sheets 22 and 24 have been operated on to produce an interlocking relationship with each other. The end view of this interlocking relationship of the two metal sheets 22 and 24 is better viewed in FIG. 1, wherein, during the stamping operation, an upset ring bead 26 is formed together with integrally formed toes 28 which extend into the four flutes 20, thus enabling interlocking sheet assembly 21 to be removed without any problem, as the toes 28 slide along the flutes 20. As indicated in FIG. 1, the diameter of the upset ring bead 26 is denoted by A, which corresponds to the diameter A shown in FIG. 4, and the toes 28 lie within a circle having a diameter B which corresponds to the diameter B of the flutes 20.

Figure 2:
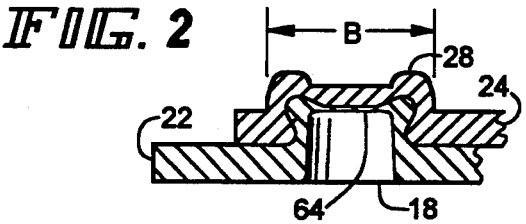
FIG. 2 is a partial cross-sectional view taken along the lines 2—2 of FIG. 1.
Figure 7:
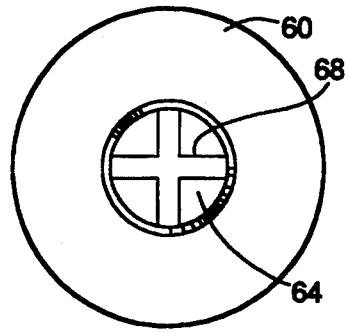
FIG. 7 is a top view of the metal discs shown in FIG. 6.
Figure 3:
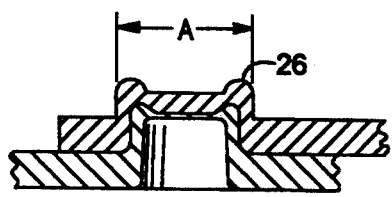
FIG. 3 is a partial cross-sectional view taken along the lines 3—3 of FIG. 1.

FIG. 3 illustrates a cross-sectional view taken along the lines 3—3 of FIG. 1, wherein the upset ring bead 26 is shown by the diameter A. FIG. 2 shows the interlocking relationship established by the toes 28 having the diameter B, which toes 28, during the stamping operation, permit the material in the metal sheets 22 and 24 to flow into the flutes 20 to establish the toes 28 responsible for interlocking the two sheets 22 and 24 together.

The true interlocking relationship is best viewed in FIG. 2, wherein the extruded material of metal sheet 22 bulges inwardly into the deformed sheet 24.

FIG. 3 shows frictional interlocking between the vertical surfaces of the two metal sheets, whereas FIG. 2 shows the mechanical interlocking between metal sheets 22 and 24.

Figure 5A:
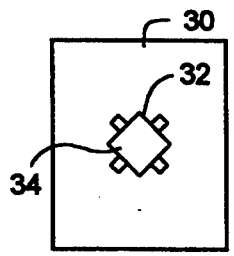
FIG. 5 illustrates dies for forming a plurality of different shaped joints according to the present invention.
Figure 5B:
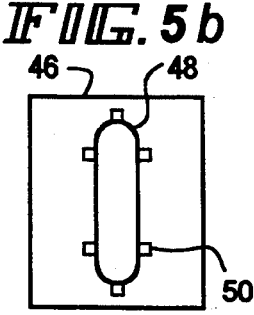
Figure 5C:
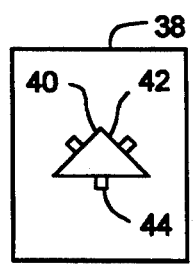

Although the apparatus for forming the embodiment described hereinbefore used a circular punch, it is apparent that other configurations can be employed using the same principle. Referring to FIG. 5, there are three different exemplary configurations which might be used. A die body 30 has a diamond-shaped aperture 32, each side 36 having a groove 34 to permit the withdrawal of the toes through the flutes 20. A die body 38 has a triangular opening 40, each side 42 having a groove 44 for accepting extruded material to form the toes. A die body 46 has an elongated oval opening 48. The end portions and the side portions of the opening 48 are provided with a plurality of grooves 50.

Figure 4:
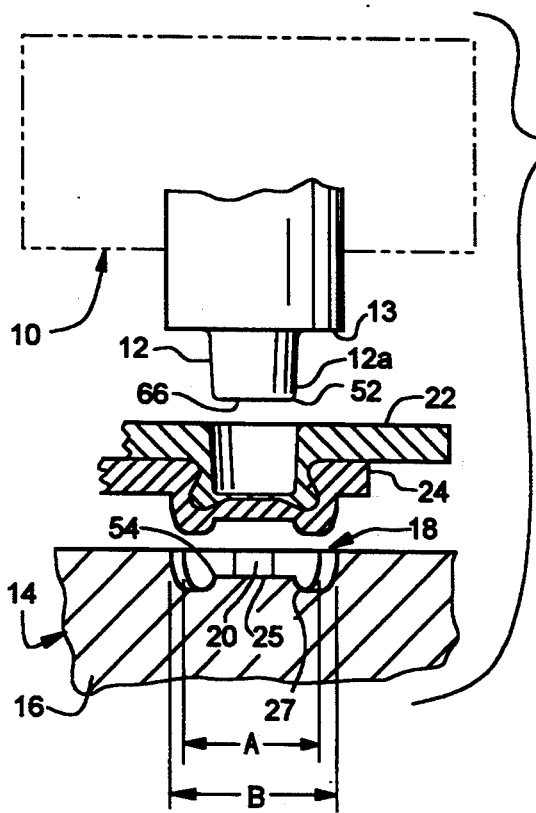
FIG. 4 shows an exploded cross-sectional view of two metal sheets after being interlocked together by punch and die assemblies.

In operation, the apparatus is initially in the position illustrated in FIG. 4, that is, the punch means 12 is suspended over the top of the die body 16. To join two or more metal sheets together, they are first placed in overlapping position and placed between the punch means 12 and the die assembly 14. Afterwards, the press is actuated to cause the punch means 12 to move downwardly towards the overlapped metal sheets 22 and 24 and the die assembly 14. Upon engagement of the die body 16 and the overlapped metal sheets, the latter is caused to be drawn downwardly toward the upper surface of an anvil 25. There is no fracturing or shearing of the metal sheets because a predetermined clearance exists between the diameter of the punch means 12 and the diameter A of the circular cavity 18. As the punch means 12 approaches the anvil 25, the punch means 12 stops short at a distance which is less than the total combined original thickness of the metal sheets 22 and 24, thereby permitting transverse or lateral extrusion of the metal which results in the formation of the laterally enlarged shape shown by the toes 28 which define a mechanical interlock between the metal sheets 22 and 24. After a strong and permanent joint has been formed, the punch means is withdrawn to the position illustrated in FIG. 4, and the sheet assembly 21, namely, the interlocked metal sheets 22 and 24, are removed.

Shearing of the sheet metal is avoided with the aforedescribed apparatus by providing radius 52 on the punch means 12 and radius 54 on the anvil 25, and an appropriate clearance between punch means 12 and the cavity opening 18.

As shown in FIGS. 1-3, a depression 56 is surrounded by the upset ring bead 26 which integrally incorporates the toes 28 which are developed during the pressing operation developed by the punch means 12 and the die body 16.

The quality of interengagement of the metal sheet 22 with metal sheet 24 can be visually judged after the pressing is completed. As shown in FIGS. 2 and 3, during the pressing operation, most of the metal that flows is provided by the metal sheet 22 so that the flowing metal forms the upset ring bead 26 and the toes 28. If insufficient force is applied during the pressing operation, there will be no formation of the depression 56, and the toes 28 will not be well developed, thereby indicating a weak interengagement, if any, between the metal sheets 22 and 24. Another factor that contributes to proper interengagement of the two sheets is in the clearance between the punch means 12 and the anvil 25. Depending on the combined thicknesses of the sheets 22 and 24, it can readily be determined what the radial clearance should be between the head of the punch means 12 and an annular wall 19 of the cavity 18 in the die body 16.

The shape of the integrally formed upset ring bead 26 and the toes 28 is best illustrated in FIG. 1. Now, referring to FIGS. 2 and 3, it will be noted that the top surface of the toes 28 lies in the same plane as the top surface of the upset ring bead 26.

Figure 6:
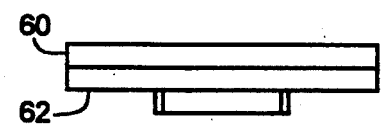
FIG. 6 shows two metal discs interlocked together.

In the event that the thicknesses of the metal sheets 22 and 24 are below the minimum thickness required for the metal sheets, in that case, the punch means 12 would penetrate too deeply into the cavity 18 to cause a bottom 64 of the cavity 18 shown in FIG. 2 to be very thin or non-existent. In that case, a face 66 of the punch means 12 may be provided with an intaglio figure to form a relief figure in the bottom 64 of the cavity 18. This is more clearly illustrated in FIG. 6, wherein two metal sheets 60 and 62 have been interengaged by the method previously described. The intaglio figure in the face 66 of the punch means 12 forms a relief FIG. 68 in the bottom 64 of the metal sheet 60. The relief FIG. 68 has a configuration of a cross. However, other designs may be utilized to form a relief in the surface of the bottom 64.

Although the present invention has been described with reference to particular embodiments, it will be apparent to those skilled in the art that variations and modifications can be substituted therefor without departing from the principles and spirit of the invention.

What is claimed is:

1. A die body useful for interlocking a pair of overlapped metal sheets which are to be extruded one into the other in a configuration forced by a punch means, said die body being defined by a cavity, said cavity further defined by a central raised portion defining an anvil, a concentric depressed groove surrounding a base of said anvil, said cavity further being defined by an inner annular wall having spaced substantially vertically extending flutes extending thereinto, said flutes being symmetrically placed with respect to each other, said flutes communicating with said depressed groove and extending laterally outwardly of said groove, the substantially vertically extending flues lying along a peripheral circle having a diameter B which is greater than a diameter A of the annular inner wall, the diameter B being greater than twice the thicknesses of the two metal sheets, the total circumferential length of the flutes is less than the total circumferential length of the wall portions extending between the flutes, said communication between said groove and each flute defining an enlarged space defining a toe, each toe extending radially outwardly of the outer periphery of said groove, whereby, the punch means having a predetermined length so that a face on said punch means stops a predetermined distance above said anvil, said distance being less than the total combined original thicknesses of the metal sheets to permit extrusion of metal from both of said sheets into said groove and said flutes, whereby upon deforming the two metal sheets in the die body, material will be extruded by the anvil into said depressed groove and into said toes to interlock the two metal sheets together.

2. A die body useful for interlocking a pair of overlapped metal sheets which are to be extruded one into the other in a configuration forced by a punch means, said die body being defined by a cavity, said cavity further defined by a central raised portion defining an anvil, a groove surrounding a base of said anvil, said cavity being formed by an annular wall in said die body, said annular wall having a plurality of substantially vertically extending flutes extending into said cavity, said flutes having open faces directed towards each other, said flutes being formed in said vertical wall, said open faces being tangential to said groove and communicating therewith, the total circumferential length of the flutes is less than the total circumferential length of the wall portions extending between the flutes, said communication between said groove and each little defining an enlarged space defining a toe, each toe extending radially outwardly of the outer periphery of said groove, whereby, upon deformation of the two metal sheets in the die body, material will be extruded from the space between the punch means and the anvil into said depressed groove and into said toes which interlock the two metal sheets together.

3. The die body according to claim 2, wherein said cavity is circular in cross-section.

4. The die body according to claim 3, wherein said vertically extending flutes are arranged in a number of pairs, members of each pair facing each other.

5. A die body useful for interlocking a pair of overlapped metal sheets which are to be extruded one into the other in a configuration forced by punch means, said die body being defined by a cavity, said cavity encompassing a centrally located anvil, a depressed groove in said body and surrounding a base of said anvil, said cavity being defined by an inner wall having substantially vertically extending flutes extending thereinto, said flutes being symmetrically placed with respect to each other, said flutes being formed in said inner wall, said flutes communicating with said depressed groove and extending laterally outwardly of said groove, the total circumferential length of the flutes is less than the total circumferential length of the wall portions extending between the flutes, said communication between said groove and each flute defining an enlarged space defining a toe, each toe extending radially outwardly of the outer periphery of said groove, whereby, upon deforming the two metal sheets in the die body, material from both sheets will be extruded from the space between the anvil and the punch means into said depressed groove and into said toes.

6. The die body according to claim 5, wherein said cavity is circular in cross-section.

7. The die body according to claim 6, wherein said vertically flutes are arranged in pairs, each pair having members facing each other.

8. Apparatus for joining two or more metal sheets, the apparatus comprising punch means, a die assembly having a die body defined by a cavity for receiving said punch means to forcibly deform portions of the metal sheets when the punch means and the die body are moved relatively towards each other in a generally vertical direction with the metal sheets disposed therebetween, anvil means centrally located in said cavity, said cavity having a vertical wall provided with a plurality of spaced substantially vertically extending flutes, said centrally located anvil means extending upwardly in said cavity to define with respect to said vertical wall of said cavity, said flutes being formed in said vertical wall, a concentrically located groove, said groove communicating with said plurality of substantially vertically extending flutes, the total circumferential length of the flutes is less than the total circumferential length of the wall portions extending between the flutes, said communication between said groove and each flute defining an enlarged space defining a toe, each toe extending radially outwardly of the outer periphery of said groove, the punch means having a predetermined length so that a face on said punch means stops a predetermined distance above said anvil means, said distance being less than the total combined original thicknesses of the metal sheets to permit extrusion of metal from both of said sheets into said groove and into spaces with integrally formed toes developed by said flutes communicating with said groove and with said extending flutes to define an upset bead.

9. The apparatus according to claim 8, wherein the cavity is complementary in shape to the cross-sectional shape of said punch means, and providing a generally uniform clearance between said punch means and said circular wall of said cavity in order to prevent shearing of the metal sheets when the metal sheets are forcibly deformed into said cavity by said punch means.

10. The apparatus according to claim 8, wherein peripheral edges of the cavity are provided with arcuate portions defined by ends of said flutes.

11. The apparatus according to claim 8, wherein the plurality of substantially vertically extending flutes comprise two pairs of flutes, each pair located diametrically across from each other, and said pairs of flutes are disposed 90° with respect to each other.

12. The apparatus according to claim 8, wherein the groove in the cavity has an outer periphery which communicates with said substantially vertically extending flutes which have outwardly extending surfaces lying in a circle concentric with the outer periphery of the groove, spacings between said circle and said periphery being greater than the thicknesses of the two metal sheets, whereby extrusion of metal from the groove into said vertical flutes interlocks the two metal sheets together.

* * * * *